United States Patent Office

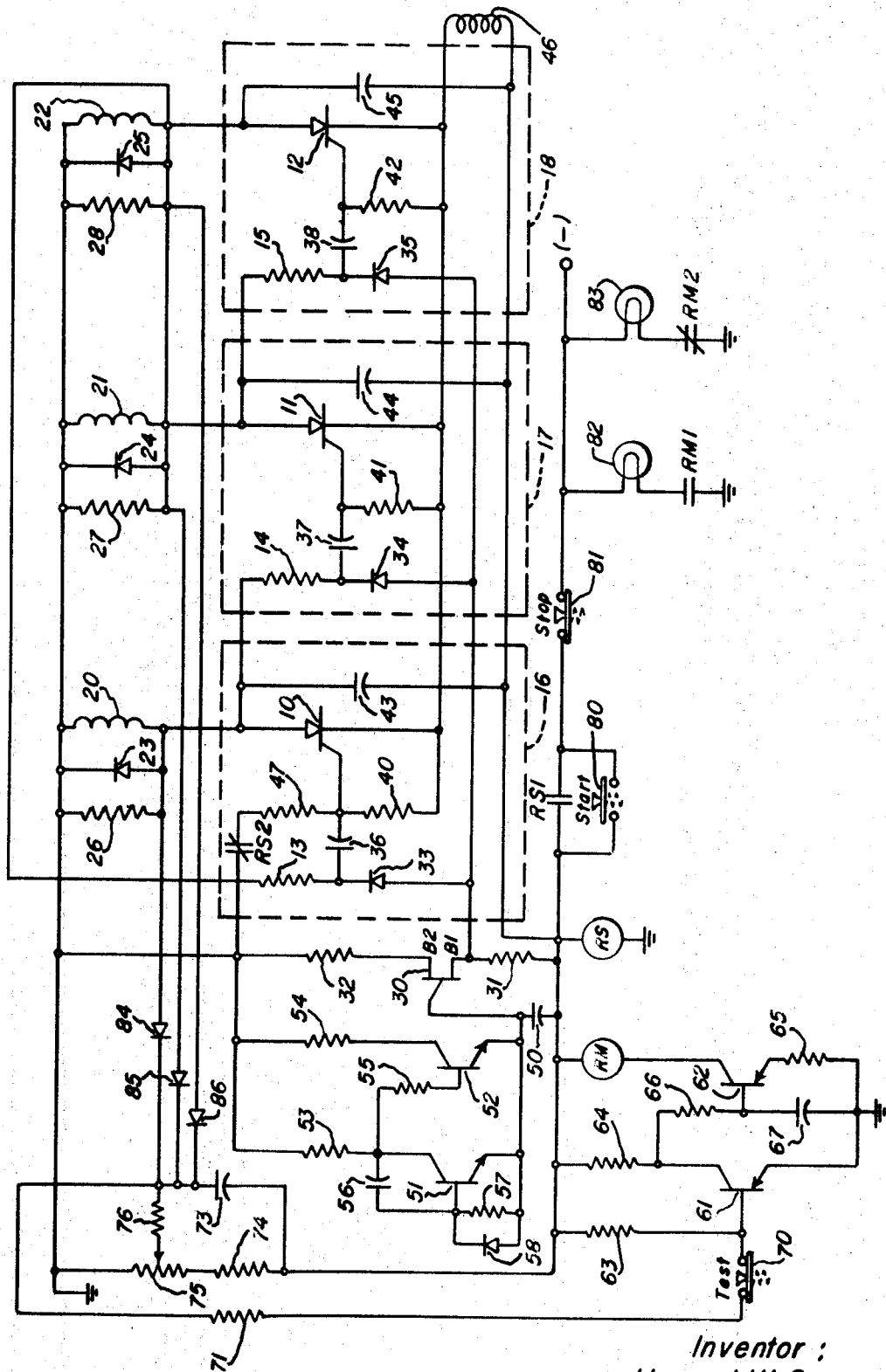

3,532,947
Patented Oct. 6, 1970

3,532,947
DIRECT CURRENT PULSE CONTROL CIRCUIT
FOR POLYPHASE SYNCHRONOUS MOTOR
Howard W. Grup, Delanson, N.Y., assignor to General
Electric Company, a corporation of New York
Filed Mar. 4, 1968, Ser. No. 710,073
Int. Cl. H02k 29/00
U.S. Cl. 318—138      15 Claims

ABSTRACT OF THE DISCLOSURE

A ring counter comprising semiconductor controlled rectifiers is employed as a direct current energizing source for driving a synchronous polyphase permanent magnet rotor motor. Reliable starting is achieved by employing a time delay circuit which retards the ring counter pulse commutation rate by a gradually decreasing amount. The retardation diminishes at a rate sufficiently gradual to permit motor speed to rise proportionately as the pulse commutation rate increases. The tachometer effect of the rotating armature is monitored to provide an indication of the motor operation.

INTRODUCTION

This invention relates to polyphase synchronous motor control circuits, and more particularly to a circuit for reliably starting a synchronous polyphase permanent magnet rotor motor.

In driving synchronous polyphase motors, a multiphase AC source is usually required to energize the stator windings. With the advent of the permanent magnet rotor type of synchronous polyphase motor, a decrease in size and weight of polyphase synchronous motors has been achieved, enlarging the possible scope of utility to include mobile, airborne and space applications. Nevertheless, such motors have been limited in their possible utilization by requiring a multiphase AC power source for energization. Moreover, because the AC line freqency is constant, external starting assistance or separate starting circuits are required in order to allow the motor to gradually increase to a speed corresponding to the line frequency.

The present invention is concerned with apparatus for driving a synchronous polyphase permanent magnet rotor at a constant speed from a direct current power supply by employing a semiconductor controlled rectifier (or SCR) ring counter circuit to generate driving pulses. The apparatus includes a starting circuit which allows the frequency or repetition rate of energizing signals to gradually increase, providing a simple and straightforward way of starting the motor without requiring any circuit connections to the motor other than the stator coil energizing connections. The gradual increase of frequency or repetition rate of energizing signals is accomplished by gradually increasing the pulse commutation rate of the ring counter circuit.

Accordingly, one object of the invention is to provide apparatus for reliably starting and operating a polyphase synchronous motor from a direct current source.

Another object is to provide simple circuitry for electrically monitoring operation of a motor at a location remote from the motor.

Another object is to provide means for accelerating a polyphase permanent magnet rotor motor by gradually increasing the repetition rate of rectangular pulses applied sequentially to the motor stator windings.

Briefly, in accordance with a preferred embodiment of the invention, a direct current pulse control circuit for energizing a polyphase synchronous motor have at least one stator winding per phase is provided. The pulse control circuit comprises ring counter means operable at a predetermined commutation rate and having a predetermined number of stages equal to the number of phases of the motor. Means are provided for coupling each stage of the ring counter to the stator windings of each phase respectively. Additional means are coupled to the ring counter for retarding the commutation rate by a gradually decreasing amount upon application of energy to the ring counter.

BRIEF DESCRIPTION OF THE DRAWING

The features of the invention believed to be novel are set worth with particularity in the appended claims. The invention itself, however, both as to organization and method of operation, together with further objects and advantages thereof, may best be understood by reference to the following description taken in conjunction with the accompanying drawing in which:

The single figure is a schematic diagram of the direct current pulse control circuit of the instant invention for controlling operation of a polyphase synchronous motor.

DESCRIPTION OF TYPICAL EMBODIMENTS

In the figure, a direct current pulse control circuit for a three-phase permanent magnet rotor motor is shown, with three semiconductor controlled rectifiers (hereinafter designated SCR's) 10, 11 and 12, each representing a separate, rectangular pulse producing ring counter stage 16, 17 and 18, respectively, having their anodes connected respectively to the respective stator windings 20, 21 and 22 of the motor. Each of the stator windings 20, 21 and 22 is connected in shunt with a diode 23, 24 and 25 respectively, for the purpose of damping transient voltages induced in the stator windings due to the switching of the SCR connected thereto; thus, when an SCR is switched from its conductive to its nonconductive condition, any transient voltage induced across the stator winding is short-circuited through the diode connected in shunt therewith, collapsing the magnetic field which had existed in the stator winding during the time the SCR was conductive and preventing otherwise large reverse transient voltages from damaging circuit components. In addition, a resistance 26, 27 and 28 is connected in shunt with each of stator windings 20, 21 and 22, respectively, for the purpose of lowering the impedance of resonance, or damping the Q, of a resonant circuit formed by the respective stator winding and its shunt capacity. This limits the amplitude of any voltage reversal across each stator winding, preventing premature cessation of conduction by the SCR connected to that stator winding due to reversal of its anode-to-cathode voltage whenever it has been rendered conductive.

The rate at which the conduction interval for an SCR is transferred in the ring counter from stage-to-stage is controlled by the rate at which a unijunction transistor 30 is triggered into conduction. Base B1 of unijunction transistor 30 receives biasing voltage through a biasing resistance 31, while Base B2 of the unijunction transistor receives biasing voltage through a biasing resistance 32. The potential on Base B1 of unijunction transistor 30 is furnished, respectively, to the gating electrode of each of SCR's 10, 11 and 12 through a series-connected circuit comprising a diode 33, 34 and 35, respectively, and a coupling capacitor 36, 37 and 38, respectively. Diodes 33, 34 and 35, which are polarized so as to apply only positive-going potentials to the trigger electrodes of the SCR's, receive bias potentials through biasing resistances 13, 14 and 15, respectively, from resistances 28, 26 and 27, respectively.

The voltage across the gate and cathode electrodes of SCR's 10, 11 and 12 is controlled by a biasing resistance 40, 41 and 42 connected therebetween, respectively. A commutating capacitor 43, 44 and 45 is connected from the anode of SCR 10, 11 and 12, respectively, to the negative supply voltage, designated (—). The commutating capacitor connected to a conducting SCR drives the cathodes of the nonconducting SCR's momentarily in a positive direction through the conducting SCR. A choke 46 is connected between the cathodes of SCR's 10, 11 and 12 in common and the negative supply voltage, in order to provide an inductive discharge path for the commutating capacitor connected to an SCR in the conductive condition.

Conduction of unijunction transistor 30 is controlled by the voltage across a capacitor 50 which is connected to the emitters of a pair of n-p-n transistors 51 and 52. Transistors 51 and 52 preferably are of identical type so as to exhibit substantially similar electrical characteristics. Collector bias is furnished to transistors 51 and 52 through a pair of biasing resistances 53 and 54, respectively, from ground, with resistance 53 being of greater ohmic value than resistance 54 by a factor conveniently about 2.5. In addition, the collector of transistor 51 is coupled to the base of transistor 52 through a coupling resistance 55. The collector and base electrodes of transistor 51 are coupled together through a capacitor 56, while the base and emitter electrodes of transistor 51 are coupled together through the shunt combination of a resistance 57 and a diode 58, diode 58 being polarized such that its anode is connected to the emitter of transistor 51 while its cathode is connected to the base of transistor 51. The circuitry associated with transistors 51 and 52 controls the rate at which capacitor 50 is charged, thereby controlling the stepping or pulse commutation rate of the SCR ring counter circuitry.

A second pair of transistors 61 and 62 of p-n-p type are provided in order to permit monitoring of motor operation at a remote location. Transistor 61 receives negative base bias through a biasing resistance 63, and negative collector bias through a biasing resistance 64. Similarly, transistor 62 receives negative collector bias through the coil of monitor relay RM, while emitter bias for transistor 62 is developed across an emitter biasing resistance 65. The collector of transistor 61 supplies signals to the base of transistor 62 through a coupling resistance 66, while the base of transistor 62 is grounded to AC transient voltages through a bypass capacitor 67. The base of transistor 61 is normally operated at a potential sufficiently negative to maintain the transistor in the conductive condition. This negative potential is furnished through the normally-closed contacts of a push-to-open "test" pushbutton 70 in series with a current limiting resistance 71 from one side of a capacitor 73. The cathodes of a trio of diodes 84, 85 and 86 are connected to the junction of a current limiting resistance 76 and capacitor 73, while the anodes of diodes 84, 85 and 86 are respectively connected to ground through windings 20, 21 and 22, respectively, together with the circuitry connected in parallel therewith. The other side of capacitor 73 is returned to the negative power supply. In addition, a voltage divider circuit comprising a resistance 74 in series with a potentiometer 75 is connected between the negative power supply and ground. The adjustable tap on potentiometer 75 is connected through current limiting resistance 76 to the junction of resistance 71 and capacitor 73.

The motor starting circuit includes a push-to-close "start" pushbutton 80 which is connected in series with a push-to-open "stop" pushbutton 81. A starting relay coil RS is connected across the negative power supply and ground when "start" pushbutton 80 is depressed. Connected in parallel with "start" pushbutton 80 are a pair of normally open relay contacts RS1 which, when "start" pushbutton 80 is depressed, are closed by energization of the coil of relay RS. At the same time, a pair of normally closed relay contacts RS2, connected in series with a current limiting resistance 47 between the gate electrode of SCR 10 and ground, are opened due to energization of the coil of relay RS.

For testing purposes, monitor relay coil RM, which is connected in series with the collector electrode of transistor 62, controls a pair of normally open relay contacts RM1 and a pair of normally closed relay contacts RM2. Contacts RM1 are connected in series with an indicator lamp 82 between the negative power supply and ground, while contacts RM2 are connected in series with an indicator lamp 83 between the negative power supply and ground. Lamps 82 and 83, which may be situated at a location remote from the motor, produce a visible response to the condition of the relay contacts in series therewith.

Operation of the motor is begun when "start" pushbutton 80 is depressed for a brief interval long enough to actuate relay RS. During the interval required for the magnetic field of the coil of relay RS to build up to a value sufficiently high to actuate the relay, SCR 10 is driven into conduction by application of voltage through normally closed contacts RS2 in series with voltage dropping resistance 47 to the gate electrode of SCR 10. When SCR 10 becomes conductive, a bucking voltage is induced across choke 46 which drives the cathodes of the SCR's in a positive direction. Because of the charge stored on capacitor 43, anode potential on SCR 10 moves in a negative direction only gradually, thereby retaining enough anode-cathode potential for SCR 10 to remain in conduction even without presence of a gate voltage. However, the diminished voltage across SCR's 11 and 12 at this time insures that neither of the latter SCR's will become conductive spontaneously due to a spurious gate voltage. Accordingly, SCR 10 remains in conduction while SCR's 11 and 12 remain out of conduction. Conduction of SCR 10 continues until the anode-cathode voltage thereon is driven to a value of suffiicently low amplitude to cause conduction to cease. Therefore, for a relatively long interval beginning at the time "start" pushbutton 80 is depressed, current flows through stator winding 20 of the motor. This provides the advantage of phase-positioning the motor rotor each time before the motor is started and, because of the relatively long interval in which the rotor may be so positioned, motor starting is highly reliable.

After relay RS has had sufficient time to actuate its contacts, normally open contacts RS1 are closed, permitting release of the "start" pushbutton without halting motor operation. In addition, normally closed contacts RS2 are opened, ending application of the relatively positive voltage to the gate electrode of SCR 10 through resistance 47.

Although capacitors 50 and 56 are substantially uncharged when "start" pushbutton 80 is initially depressed, they both begin to charge at that time. As long as capacitor 56 is substantially uncharged, transistor 51 is substantially fully conductive, due to the base-emitter bias resulting from the voltage drop across resistance 57. The large voltage drop which thus results across resistance 53 maintains the collector-emitter voltage on transistor 51 at a relatively low value. This, in turn, maintain the base-emitter voltage on transistor 52 at a relatively low positive value through coupling resistance 55, so that transistor 52 initially is substantially nonconductive.

As time elapses, capacitor 56 begins to acquire a charge, and the base-emitter potential on transistor 51 consequently begins to drop. Thus, transistor 51 starts to become less conductive, and the collector voltage thereon accordingly begins to increase in a positive direction. This results in transistor 52 gradually becoming conductive. As transistor 52 gradually becomes more conductive and transistor 51 gradually becomes less conductive, the charging rate of capacitor 50 begins to increase. This is because the ohmic value of resistance 53 is several times that of resistance 54 and, since transistors 51 and 52 preferably have substantially similar electrical characteristics, a large current flow occurs through transistor 52 when fully conductive than through transistor 51 when fully conductive.

As voltage across capacitor 50 continues to increase, the emitter voltage on unijunction transistor 30 increases accordingly. When emitter voltage on transistor 30 reaches an amplitude sufficiently high to forward bias the emitter-base B1 electrodes, the transistor is driven into conduction, causing capacitor 50 to discharge current through resistance 31. The positive-going voltage pulse which thus appears at the base B1 electrode of transistor 30 is applied to the anodes of each of diodes 33, 34 and 35. However, capacitor 36 has acquired a charge through resistances 13 and 40 and capacitor 38 has acquired a charge through resistances 15 and 42 during the conduction interval of SCR 10, tending to reverse bias diodes 33 and 35. Capacitor 37 remains relatively uncharged at this time due to the low conduction voltage drop across SCR 10 and the increased voltage drop across stator winding 20 and resistance 26 in parallel. At this same time, each of capacitors 44 and 45 is fully charged, due to the large voltage drop across each of nonconducting SCR's 11 and 12, respectively. However, capacitor 43 is substantially discharged, due to the lowered voltage drop across SCR 10 which exists during the conduction interval thereof.

During conduction of SCR 10, the cathode potential of diode 34 is more negative than the cathode potential of diodes 35 and 33, due to the more negative anode potential on SCR 10 than on SCR's 11 and 12, respectively, and due to the lack of a reverse biasing voltage from capacitor 37 such as exists on capacitors 36 and 38. Accordingly, the positive-going voltage pulse which appears across resistance 31 when unijunction transistor 30 fires is of sufficient amplitude to forward bias diode 34 only, so that the gate electrode of SCR 11 only receives a positive pulse. This positive pulse triggers SCR 11 into conduction, thereby drawing current through resistance 27 and stator winding 21. In addition, the charges stored on capacitors 44 and 38 are discharged through SCR 11 and inductor 46, inducing an opposition voltage across inductor 46 which drives the cathodes of SCR's 10, 11 and 12 in a positive direction. This drops the anode-cathode voltage across SCR 10 to a value which is sufficiently low as to halt conduction thereof. However, the time required for capacitor 44 to discharge through SCR 11 and inductor 46 is long enough to maintain the anode of SCR 11 sufficiently positive with respect to the cathode to insure conduction of SCR 11 throughout the time in which the positive-going voltage pulse exists on base B1 of transistor 30. Upon cessation of the positive-going voltage pulse therefore, SCR 11 remains in the conductive condition, SCR's 10 and 12 are in the nonconductive condition, stator winding 21 is energized, and stator windings 20 and 22 are de-energized. In addition, capacitor 36 remains charged while capacitor 37 acquires a charge through resistances 14 and 41 of polarity tending to reverse bias diode 34.

During the time in which the motor rotor position advances from the phase corresponding to stator winding 20 to the phase corresponding to stator winding 21, capacitor 56 has continued to acquire a charge, rendering transistor 51 increasingly nonconductive and transistor 52 increasingly conductive. Capacitor 50 therefore charges at a faster rate than previously, due to its decreased RC time constant, so that unijunction transistor 30 next fires after a shorter interval following the preceding firing than previously. Again, a positive-going voltage pulse is produced on base B1 of transistor 30 which, by virtue of the now relatively high negative voltage on the anode of SCR 11, drives the gate electrode of SCR 12 in a positive direction through diode 35 and capacitor 38. The gate electrodes of SCR's 10 and 11 are not driven positive at this time because of the reverse bias on diodes 33 and 34 respectively, due to the relatively low negative anode potential on SCR's 12 and 10, respectively, and due to absence of a reverse biasing voltage from capacitor 38 such as exists on capacitors 36 and 37. Accordingly, SCR 12 is driven into conduction, and the anode-cathode voltage thereon is maintained at a relatively high value, due to the voltages stored on capacitors 45 and 36, while the induced opposition voltage across inductance 46 drives the cathodes of all the SCR's in common in a positive direction so as to drop the anode-cathode voltage across SCR 11 to a value insufficient to maintain conduction thereof. Upon completion of the positive-going voltage pulse from base B1 of transistor 30, SCR 12 remains in conduction, while SCR's 10 and 11 remain out of conduction. Consequently, stator winding 22 is now energized, stator windings 20 and 21 are now deenergized, and the rotor has been advanced to the phase corresponding to stator winding 22. In addition, capacitor 37 remains charged while capacitor 38 acquires a charge through resistances 15 and 42 of polarity tending to reverse bias diode 35. Capacitor 36 remains relatively uncharged due to the low conduction voltage drop across SCR 12 and the increased voltage drop across stator winding 22 and resistance 28 in parallel.

The next firing of the unijunction transistor 30 occurs after yet a still smaller interval than previously, due to the increased charging rate of capacitor 50 caused by the decreased resistance in series therewith as transistor 51 continues to be driven toward a fully nonconductive condition and transistor 52 continues to be driven toward a fully conductive condition. This next firing of unijunction transistor 30 drives the anodes of diodes 33, 34 and 35 in a positive direction, thereby driving the gate electrode of SCR 10 positive through diode 33 due to the relatively high negative potential on the anode of SCR 12 and hence on the cathode of diode 33. The gate electrodes of SCR's 11 and 12 are not driven positive at this time because of the reverse bias on diodes 34 and 35 respectively, due to the relatively low negative anode potential on SCR's 10 and 11, respectively, and due to absence of a reverse biasing voltage from capacitor 36 such as exists on capacitors 37 and 38. Accordingly, SCR 10 is triggered into conduction, and the resulting discharge of capacitors 43 and 37 through SCR 10, combined with the opposition voltage induced across inductor 46, raises the cathode potential on each of SCR's 10, 11 and 12 sufficiently high to drive SCR 12 out of conduction. Upon completion of the positive pulse from transistor 30, current again flows through stator winding 20, having ceased flowing through stator winding 22.

It is evident that the interval between successive firings of unijunction transistor 30 becomes increasingly smaller as time progresse until, when transistor 51 is fully nonconductive and transistor 52 is fully conductive, the interval is of minimum duration. At this time, the ring counter is driven at the desired frequency for normal operation of the synchronous motor, so that the motor is driven at its desired speed. Thus, in the running mode, the pulse commutation frequency is controlled essentially by the RC time constant of resistance 54 and capacitor 50. To change the commutation frequency therefore, it is necessary to change only the size of capacitor 50, or the size of resistance 54, or both. To change the interval required for the ring counter to reach its normal operating frequency, it is necessary to change only the size of capacitor 56. Conveniently therefore, any or all of capacitors 50 and 56 and resistance 54 may be made variable if desired.

To briefly recapitulate operation, depressing "start" pushbutton 80 causes a gradual increase in voltage across capacitor 56 so that the collector-emitter resistance of transistor 52 gradually decreases. This results in a gradual decrease of resistance in series with capacitor 50 which makes the period between successive firings of unijunction transistor 30 become shorter, due to the more rapid rate at which capacitor 50 now charges, until the normal running frequency is reached. At this time, the collector-emitter resistance of transistor 52 is a minimum.

As the period between successive firings of unijunction transistor 30 becomes shorter, the previously conducting SCR becomes nonconductive sooner, and the next successive SCR consequently is driven into conduction sooner. In this manner, conduction of the ring counter stages occurs in stepwise fashion, with the rate of commutation from stage-to-stage increasing gradually from a slow starting rate to a normal running rate. Accordingly, when the ring counter reaches its normal running rate, each stator winding of the three-phase motor receives energizing current from the ring counter during one-third the rotational cycle of the motor, but receives no energizing current therefrom for the remaining two-thirds of the motor rotational cycle. It should be noted that where more than one stator winding per phase is employed, the ring counter may, if desired, contain a number of stages equal to the number of windings, each stage being connected to a separate winding. Thus, where the phases each contain the same number of windings, the ring counter contains a number of stages equal to a multiple of the number of phases of the motor greater than one.

During motor operation, advantage may be taken of the nonenergized period of a stator winding to monitor the electrical waveform produced by the tachometer effect of the rotating armature. This waveform contains frequency and phase information, and its amplitude is directly related to motor speed. Thus, during motor operation, transistor 61 is normally conducting and transistor 62 normally nonconducting, so that relay RM is de-energized. Capacitor 73 is charged to a voltage amplitude determined by the tap setting on potentiometer 75 so that only those voltages from windings 20, 21 and 22, which are more positive than the voltage at the tap of potentiometer 75, are supplied through resistance 71 and "test" pushbutton 70 to the base of transistor 61. This occurs only during the respective nonconducting periods of windings 20, 21 and 22, when voltage is induced in a winding due to the changing magnetic field produced by the rotating permanent magnet armature. Although the voltages induced across windings 20, 21 and 22, due to the tachometer effect, are so low that diodes 23, 24 and 25 remain nonconductive in their presence, the voltage on capacitor 73 is adjusted so that diodes 84, 85 and 86 are slightly forward biased when SCR's 10, 11 and 12, respectively are nonconducting. Therefore, any increase in current through any of diodes 84, 85 and 86 drives the base of transistor 61 in a positive direction. Accordingly, transistor 61 is driven out of conduction, lowering the voltage drop across resistance 64. The collector voltage on transistor 61 consequently moves in a negative direction, driving the base if transistor 62 in a negative direction so as to render transistor 62 conductive. This energizes the coil of relay RM, actuating the relay to close its contacts RM1 and open its contacts RM2 so as to energize lamp 82 and de-energize lamp 83. Therefore, as long as the motor is rotating at a sufficiently high speed to produce a tachometer effect which renders diodes 84, 85 and 86 conductive, lamp 82 is lit and lamp 83 is dark.

To assure that relay RM is not jammed in an energized condition, "test" pushbutton 70 may be depressed, so as to hold the base of transistor 61 at a negative potential through resistance 63. This renders taransistor 61 conductive, moving the collector voltage thereon in a positive direction so as to drive transistor 62 out of conduction. Accordingly, the coil of relay RM is de-energized, opening contacts RM1 to de-energize lamp 82 and closing contacts RM2 to energize lamp 83. Similarly, with the "test" pushbutton not depressed, slow rotation of the motor induces stator potentials which are too low to bias transistor 61 out of conduction so that, under these conditions, transistor 61 is conductive and transistor 62 is nonconductive, maintaining lamp 82 in a de-energized or dark condition and lamp 83 in an energized or lit condition. Furthermore, in the event one or more of the stator windings should fail to produce a sufficiently high voltage to enable transistor 61 to be maintained biased out of conduction, lamp 82 will turn off and lamp 83 will turn on. Thus, lamps 82 and 83 may be used conveniently to detect faults in the motor circuit.

To halt motor operation, "stop" pushbutton 81 is depressed for a time long enough to permit the coil of relay RS to de-energize and open its contacts RS1, thereby de-energizing the entire circuit. At this time, diode 58 and resistance 53 furnish a path which facilitates rapid discharge of capacitors 50 and 56. Moreover, de-energization of relay RS results in reclosing relay contacts RS2 so as to assure that, when the circuit is next initially energized, winding 20 will be the first winding of the motor stator to be energized.

The foregoing describes apparatus for reliably starting and operating a polyphase synchronous motor from a direct current source of power. The apparatus includes circuitry for starting a polyphase permanent magnet rotor motor by gradually increasing the repetition rate of substantially rectangular pulses used for sequentially energizing the motor stator windings, and additional circuitry for electrically monitoring operation of the motor at a location remote from the motor.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

I claim:

1. Means for energizing the stator windings of a polyphase synchronous motor from a direct current power supply comprising:

ring counter means exhibiting a predetermined commutation rate and having a predetermined number of stages equal to the number of phases of said motor, said motor having at least one stator winding per phase;

means coupling each stage of said ring counter means to said stator windings of each phase respectively for sequentially energizing said stator windings on a continuous basis subsequent to the initiation of operation of said ring counter means; and means coupled to said ring counter means for retarding the commutation rate by a gradually decreasing amount during the initial operating interval of said ring counter means, said retarded commutation rate energizing successive windings of said motor for intervals gradually decreasing to a predetermined interval whereupon each winding of said synchronous motor is energized by pulses having a width approximately equal to the period of the energizing pulse waveform divided by the number of stages of said ring counter means.

2. The circuit for energizing a polyphase synchronous motor of claim 1 wherein each stage of said ring counter means includes a semiconductor controlled rectifier having its anode electrode coupled to one stator winding of said motor respectively and capacitor means coupling said anode electrode to the gate electrode of the next semiconductor controlled rectifier of the next successive stage respectively, inductor means, and means coupling said inductor means to the anode and cathode of each of said semiconductor controlled rectifiers.

3. The circuit for energizing a polyphase synchronous motor of claim 1 wherein said means for retarding the commutation rate comprises pulse generating means coupled to each stage of said ring counter means for sequentially driving the stages of said ring counter means into conduction upon occurrence of each pulse, said pulse generating means including capacitor means, means coupled to said capacitor means for abruptly discharging said capacitor means when the voltage on said capacitor means reaches a predetermined amplitude, and first and second resistance means coupled to said capacitor means for furnishing direct current to said capacitor means, said first and second resistance means including means for gradually increasing the ohmic value of said first resistance means and gradually decreasing the ohmic value of said second resistance means.

4. The circuit for energizing a polyphase synchronous motor of claim 3 wherein said first and second resistance means comprises first and second transistors, each of said transistors having a collector electrode, an emitter electrode, and a base electrode, first and second resistors coupled respectively to said collector electrodes, means coupling the collector electrode of said first transistor to the base electrode of said second transistor, means coupling the emitter electrode of said first and second transistors to said capacitor means, and additional capacitor means coupling the collector electrode of said first transistor to the base electrode of said first transistor.

5. The circuit for energizing a polyphase synchronous motor of claim 4 wherein said means coupled to said capacitor means for abruptly discharging said capacitor means comprises a unijunction transistor.

6. The circuit for energizing a polyphase synchronous motor of claim 2 wherein said means for retarding the commutation rate comprises pulse generating means coupled to the gate electrode of each of said semiconductor controlled rectifiers for sequentially driving the semiconductor controlled rectifiers into conduction upon occurrence of each pulse, said pulse generating means including capacitor means, means coupled to said capacitor means for abruptly discharging said capacitor means when the voltage on said capacitor means reaches a predetermined amplitude, and first and second resistance means coupled to said capacitor means for furnishing direct current to said capacitor means, said first and second resistance means including means for gradually increasing the ohmic value of said first resistance means and decreasing the ohmic value of said second resistance means.

7. The circuit for energizing a polyphase synchronous motor of claim 6 wherein said first and second resistance means comprises first and second transistors, each of said transistors having a collector electrode, an emitter electrode and a base electrode, first and second resistors coupled respectively to said collector electrodes, means coupling the collector electrode of said first transistor to said base electrode of said second transistor, means coupling the emitter electrode of said first and second transistors to said capacitor means, and additional capacitor means coupling the collector electrode of said first transistor to the base electrode of said first transistor.

8. The circuit for energizing a polyphase synchronous motor of claim 7 wherein said means coupled to said capacitor means for abruptly discharging said capacitor means comprises a unijunction transistor.

9. A circuit for reliably starting and operating a polyphase synchronous motor from a direct current power supply comprising:
ring counter means having a predetermined number of stages equal to the number of phases of said motor, said motor having at least one stator winding per phase;
means coupling each stage of said ring counter to the stator windings of each phase respectively for sequentially energizing said stator windings on a continuous basis subsequent to the initiation of conduction in said ring counter means;
switching means coupled to said ring counter means;
means responsive to said switching means for energizing a predetermined stage of said ring counter means each time current flow is initiated through said ring counter means, said initial energization period of said predetermined stage being for a relatively long period to provide prolonged current flow through the stator winding coupled to said predetermined stage for positioning the rotor of said synchronous motor; and
means coupled to said ring counter means for switching successive stages of said ring counter means after gradually decreasing conduction intervals whereupon each stage of said ring counter means is switched for equal intervals to provide stator winding energization pulses having a width approximately equal to the period of the energization pulse waveform divided by the number of stages of said ring counter means.

10. The circut for reliably starting and operating a polyphase synchronous motor from a direct current power supply of claim 9 wherein each stage of said ring counter means includes a semiconductor controlled rectifier having an anode electrode, a cathode electrode, and a gate electrode, means coupling the anode electrode of each semiconductor controlled rectifier respectively to one stator winding of said motor, capacitor means coupling the anode electrode of each semiconductor controlled rectifier to the gate electrode of the semiconductor controlled rectifier of the next successive stage, inductor means, and means coupling said inductor means to the anode and cathode of each of said semiconductor controlled rectifiers, said means responsive to said switching means for energizing a predetermined stage of said ring counter means comprising relay contacts coupling the gate electrode of the semiconductor controlled rectifier in said predetermined stage of said ring counter means to said power supply each time current flow is initiated through said ring counter means.

11. The circuit for reliably starting and operating a polyphase syncchronous motor from a direct current power supply of claim 9 wherein said pulse timing means for retarding the communtation rate comprises pulse generating means coupled to each stage of said ring counter means for sequentially driving the stages of said ring counter means into conduction upon occurrence of each pulse, said pulse generating means including capacitor means, means coupled to said capacitor means for abruptly discharging said capacitor means when the voltage on said capacitor means reaches a predetermined amplitude, and first and second resistance means coupled to said capacitor means for furnishing direct current to said capacitor means, said first and second resistance means including means for gradually increacsing the ohmic value of said first resistance means and decreasing the ohmic value of said second resistance means.

12. A circuit for monitoring operation of a polyphase synchronous motor from a direct current power supply comprising:
ring counter means having a predetermined number of stages equal to the number of phases of said motor, said motor having at least one stator winding per phase;
means coupling each stage of said ring counter means to the stator windings of each phase respectively for energizing said windings in a predetermined sequence determined by said ring counter means; and
voltage amplitude detecting means coupled to said stator windings for providing a visible indication of stator winding integrity and motor rotation when said motor is operating above a predetermined speed by a measurement of induced current flow through said stator windings when said stator windings are not being energized by said ring counter means.

13. The circuit for monitoring operation of a polyphase synchronous motor from a direct current power supply of claim 12 wherein said voltage amplitude detecting means comprises bias means producing a predetermined voltage level of one polarity, diode means, each of said diode means having one electrode coupled respectively to one of said stator windings and the other electrode coupled to said bias means, and indicator means coupled to said other electrode of each of said diode means for sensing the voltage level thereon in order to produce a visible manifestation thereof.

14. Means for energizing the stator windings of a polyphase synchronous motor from a direct current power supply comprising:

ring counter means exhibiting a predetermined commutation rate and having a predetermined number of stages equal to the number of windings of said motor, said motor having at least one stator winding per phase; means coupling each stage of said ring counter means to each of said stator windings respectively for sequentially energizing said stator windings on a continuous basis subsequent to the initiation of operation of said ring counter means; and means coupled to said ring counter means for retarding the commutation rate by a gradually decreasing amount during the initial conduction period of said ring counter means, said retarded commutation rate energizing successive windings of said motor for intervals gradually decreasing to a predetermined interval whereupon each winding of said synchronous motor is energized by said ring counter means for equal intervals by pulses having a width approximately equal to the period of the pulse wave form divided by the number of stages of said ring counter.

15. The circuit for energizing a polyphase synchronous motor of claim 14 wherein each stage of said ring counter means includes a semiconductor controlled rectifier having its anode electrode coupled to one stator winding of said motor respectively and capacitor means coupling said anode electrode to the gate electrode of the next semiconductor controlled rectifier of the next successive stage respectively, inductor means, and means coupling said inductor means to the anode and cathode of each of said semiconductor controlled rectifiers.

References Cited

UNITED STATES PATENTS

| | | | |
|---|---|---|---|
| 2,784,365 | 3/1957 | Fenemore et al. | 318—138 |
| 3,227,436 | 1/1966 | Cockrell | 318—138 |
| 3,247,433 | 4/1966 | Lasch et al. | 318—138 |
| 3,324,467 | 6/1967 | Crow et al. | 318—138 |
| 3,328,658 | 6/1967 | Thompson | 318—415 XR |
| 3,411,058 | 11/1968 | Madsen et al. | 318—138 |

ORIS L. RADAR, Primary Examiner

G. Z. RUBINSON, Assistant Examiner

U.S. Cl. X.R.

318—171, 415